May 24, 1966     D. D. HUSTON ET AL     3,252,489

COMBINATION AXE AND KNIFE SHEATH

Filed Aug. 4, 1964

INVENTORS.
DAISY D. HUSTON
MABEL CUNNINGHAM
BY
Kimmel & Crowell
ATTORNEYS.

3,252,489
COMBINATION AXE AND KNIFE SHEATH
Daisy D. Huston, 9th and Ohio, Clinton, Mo., and
Mabel Cunningham, Clinton, Mo.
Filed Aug. 4, 1964, Ser. No. 387,320
1 Claim. (Cl. 145—62)

The present invention relates generally to sporting equipment and in particular to a combination huntsman's axe and hunting knife.

The primary object of the present invention is to provide a combination axe handle and sheath for a hunting knife for use by sportsmen, hunters, or the like, and one which obviates the need for a separate knife sheath for carrying a hunting knife.

Another object of the present invention is to provide an axe of such construction that the weight of the handle may be varied by inserting a hunting knife into a bore in the axe handle, thus permitting the axe handle to be relatively light in weight without the knife, or heavier with the knife in place.

A further object is to provide a sheath for a knife which is novel, one not easily lost or misplaced when used by a sportsman or hunter, one which completely encloses the handle and blade of a hunting knife, and one which is highly effective in action.

A still further object is to provide a combination axe and knife for use by hunters, sportsmen and the like in which the blade and handle of the axe may be formed integrally of metal and in which the bore in the axe handle may be formed to snugly receive therein a hunting knife of conventional shape and size.

Figure 1:
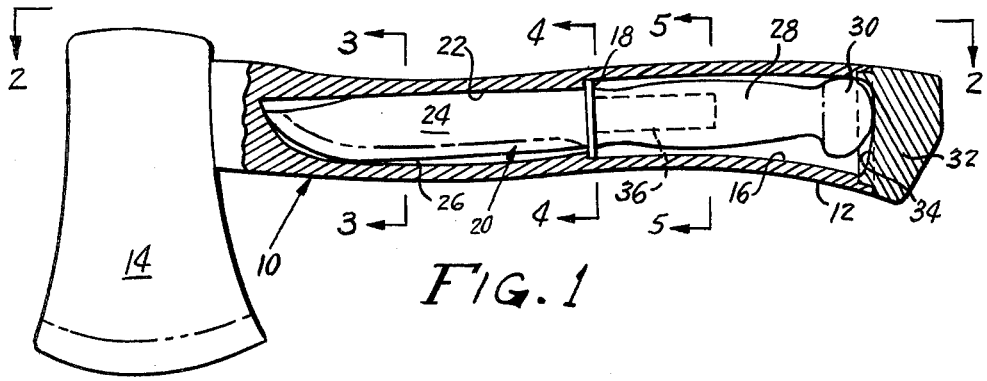
Figure 2:
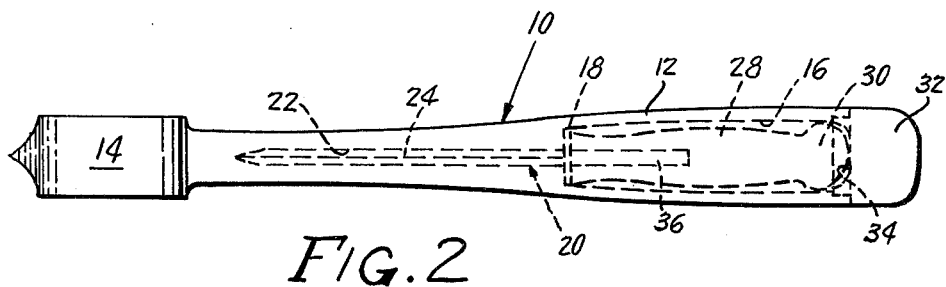
Figure 3:
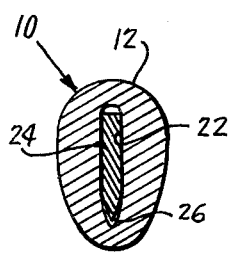
Figure 4:
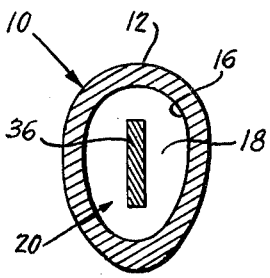
Figure 5:
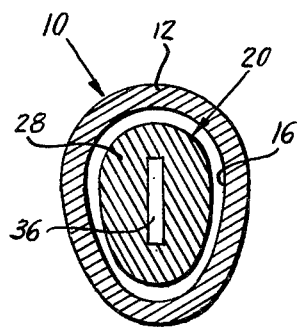

These and other objects and advantages of the invention will be fully understood from the following description when considered in connection with the following drawing, in which:

FIGURE 1 is a view of the invention as seen from one side, the handle being shown partially in section;
FIGURE 2 is a view taken on line 2—2 of FIG. 1;
FIGURE 3 is a view taken on line 3—3 of FIG. 1;
FIGURE 4 is a view taken on line 4—4 of FIG. 1; and
FIGURE 5 is a view taken on line 5—5 of FIG. 1.

Referring in detail to the drawing, in which like numerals indicate like parts in the several views, the invention consists in an axe 10 having a handle 12 with a blade 14 on one end of the handle 12.

The handle 12 is formed with a bore 16 extending inwardly from the end remote from the blade 14 and the bore 16 terminates at a point substantially midlength of the handle 12. The bottom of the bore 16 is oval in shape and snugly receives the shoulder 18 of a hunting knife 20 as shown in FIG. 4.

The axe handle 12 is formed with a rectangular slot 22 of a size to receive therein the blade 24 of the knife 20 and the slot 22 has one end with a long taper so as to protect the cutting edge 26 of the knife blade 24, as shown most clearly in FIG. 3.

The knife 20 is of conventional shape and size with the handle 28 formed slightly oval in cross section and also formed to fit the hand of a user with a large portion 30 on the free end, the portion 30 being more or less in the shape of a ball.

A cap 32, hollowed out on its inner face as at 34 so as to snugly fit over the ball portion 30 of the knife 20, is removably secured to the axe handle 12 closing the open end of the bore 16. The cap 32 may have threads to mate with threads on the handle 12, or other conventional securing means may be employed.

The knife blade 24 is formed with a tang 36, shown in dotted lines in FIGS. 1 and 2, for securement of the blade 24 in the knife handle 28, as is customary in tool construction.

Preferably the axe 10 may be formed of forged steel in one piece, with the blade 14 integral with the handle 12. The knife 20 may be fabricated in one piece or may have a leather handle and steel blade, with the shoulder 18 fabricated of metal, plastic, or of any suitable material as desired.

In use, the axe handle 12 will have one weight with the knife 20 seated in the interior of the handle 12 or will have a lesser weight when the knife 20 is removed. A feature of the invention resides in the shape of the bottom of the bore 16. It is most efficient when shaped to snugly receive the shoulder 18 of the knife 20. This permits sheathing of the knife in the axe handle without substantial movement therein, the cap 21 holding snugly against the handle portion 30.

The use of the axe with or without the knife inside its handle will be obvious, and the hunter or sportsman may soon become accustomed to the weight of the axe handle so that he will know whether or not the knife is in the sheath of the handle.

The invention is seen therefore to bear out the objects, that a sheath for totally enclosing a knife is provided, a separate sheath for each a knife and for an axe is obviated, and a new and useful tool for sportsmen, hunters, or the like has been provided.

While only a preferred embodiment of the invention has been illustrated and described, it is to be understood that other embodiments may be practiced, and that numerous modifications and changes may be made in the invention without departing from the spirit of the invention, as set forth in the appended claim.

What is claimed is:

The combination of an axe handle and a hunting knife, said handle having an axe blade at one end and a bore extending inwardly from the other end thereof and terminating at a point substantially midlength of said handle,
  there being a slot in said handle extending from the bottom of said bore to a point adjacent to and spaced from the other end of said handle,
  said slot being substantially rectangular in cross section,
  said bore being substantially oval in cross-sectional configuration and disposed with the long transverse axis thereof in alignment with the long transverse axis of said slot, and having an open end,
  a hunting knife having a handle and a blade carried by one end of the knife handle,
  a shoulder on said knife between said knife handle and said blade,
  said shoulder being conformably shaped to snugly fit and seat on the bottom of said bore,
  said knife being insertable into and withdrawable from said bore with the knife blade receivable in said slot and the handle of said knife being wholly receivable in said bore, said knife being thus wholly contained within said slot and bore, and an end cap having a shoulder thereon defining a projection of a diameter to frictionally engage with said open end of said bore and an inner surface abutting the end of said knife handle when said shoulder between said knife handle and said blade seats on the bottom of said bore, said cap completely closing the end of said bore, and being removable to expose said bore and slot for withdrawal of said knife.

References Cited by the Examiner

UNITED STATES PATENTS

| | | | |
|---|---|---|---|
| 2,005,176 | 6/1935 | Arbuckle | 145—62 |
| 2,717,442 | 9/1955 | Smith | 145—62 X |

FOREIGN PATENTS 511,849  9/1920  France.

WILLIAM FELDMAN, *Primary Examiner.*

MILTON S. MEHR, *Examiner.*

R. V. PARKER, JR., *Assistant Examiner.*